United States Patent Office 2,705,543
Patented Apr. 5, 1955

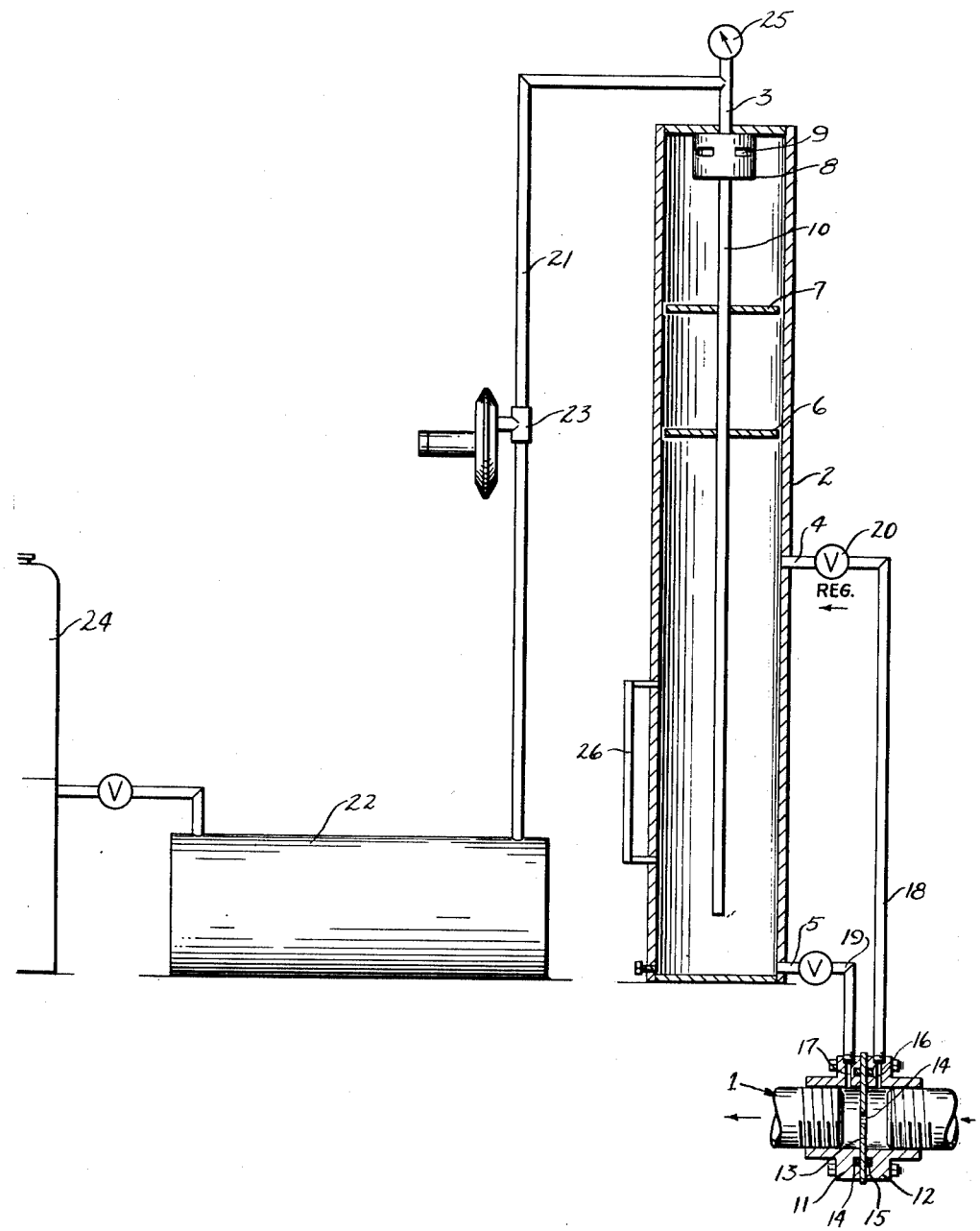
Lorenzo Torres
INVENTOR.

2,705,543

DIFFERENTIAL FLOW LIQUID-GAS SEPARATOR

Lorenzo Torres, Cucuta, Colombia

Application September 2, 1952, Serial No. 307,541

8 Claims. (Cl. 183—2.5)

This invention relates to a liquid and gas separator system for separating a quantity of gas from a liquid-gas admixture. In one of its aspects, it relates to such a system which is particularly adapted for separating a quantity of gas from a liquid-gas admixture flowing in a transfer conduit.

At many points throughout the petroleum industry, it is conventional to drive a pump with an internal combustion engine where the pump is employed to move petroleum products through a conduit, pipe line, transfer line or the like. Due to the relative cheapness of natural gas or similar normally gaseous hydrocarbons, they are ordinarily preferred to gasoline as a fuel for driving the engine. Also, the use of such gaseous hydrocarbons obviates periodic refilling of a fuel tank and also the hazards of handling gasoline. In many instances, the preference for natural gas over gasoline has resulted in the piping of gas by a separate line to the various engine and pump units even when the latter are relatively isolated from a source of gas. For example, in the pumping of oil wells, it is conventional to power the pumping rig with a gas driven engine, the gas being piped to the well site by a separate line. While such systems are indeed workable, they do necessitate the laying of a separate gas line to each well site and the maintenance of such line during the operation of the well. In many instances, such gas lines to the engines must be provided with scrubbers gasoline drips, and the like to insure against slugs of liquid reaching the engine so as to provide a dry gas for operating the engine.

It is an object of this invention to provide a gas-liquid separator adapted to be installed at the site of the well to provide dry gas for the engine, thereby eliminating the necessity of laying a separate line to each well site.

Another object of this invention is to provide a gas-liquid separation system adapted to separate the gas required to operate an engine driving a pump moving a mixture of liquid and normally gaseous hydrocarbons through a flow line, the separation system itself embodying no continuously moving parts such as pumps and the like.

Another object of this invention is to provide such a separation system which not only eliminates the use of moving parts but also eliminates the use of float valves and the like for controlling the separation of gas required to operate the engine.

Another object of this invention is to provide such a gas-liquid separator system which will not only provide the gas for operating an engine from a fluod containing normally gaseous hydrocarbons and which is being pumped through a flow line, but will also cause the engine to stop should the flow in the flow lines cease for any reason.

Another object of this invention is to provide a liquid-gas separator system for separating a desired quantity of gas from a flow line containing a liquid-gas admixture, the system employing an accumulator vessel into which a portion of the fluid flowing through the flow line is caused to pass for separation of the gas, by the creation of a pressure differential in the flow line thereby eliminating the necessity for providing any pumps for returning unused liquid or gas from the vessel to the flow line.

Another object of this invention is to provide in a gas-liquid separation system a flow restricting device adapted to be inserted into a flow line to create a pressure differential between spaced apart points therein so that a portion of the fluid in the flow line is diverted into a separator vessel, and further so that a portion of the fluid so diverted is returned from the vessel to the flow line without requiring the use of float valves, pumps, or similar devices.

Other objects, advantages and features of this invention will be apparent to one skilled in the art upon a consideration of the written specification, the appended claims and the drawing wherein there is illustrated a preferred embodiment of the apparatus of this invention.

Referring to the drawing, there is shown a flow conduit or line, designated generally by the numeral 1, adapted to conduct a petroleum liquid containing normally gaseous hydrocarbons in solution, a portion of the latter to be separated for use in powering an internal combustion engine and particularly one employed to drive the pump which causes the fluid to move through conduit 1. Conduit 1 can be the flow line from a pumping well to a storage battery and, in such instance, will contain crude petroleum which almost invariably has natural gas releasable therefrom, particularly upon a reduction in pressure of the crude. In such instance, the gas separated is employed to drive an engine which supplies power for the pumping unit operating at the well. Flow line 1 also can be an ordinary pipeline employed to conduct petroleum products, such as crude oil, from one place to another and, in such event, the gas separated in the system of this invention can be employed to drive the engines powering the pumps which move the crude petroleum through the pipeline or even to power other engines employed on the premises for other purposes. Thus, it will be seen that the apparatus of this invention is employable to remove a gas from a petroleum liquid flowing in a pipeline for substantially any purpose.

An accumulator or separator vessel 2 is provided and is illustrated as being a cylindrical vertical tank having a gas outlet 3, a liquid-gas inlet 4 and a liquid or liquid-gas outlet 5. It will be noted that outlets 3 and 5 are vertically spaced from each other, outlet 3 being preferably near the upper extremity of the vessel and outlet 5 preferably being near the lower extremity of the vessel. Intermediate these two outlets, the liquid-gas inlet 4 is disposed to discharge fluid internally of the vessel. In a preferred embodiment, a baffle system is disposed principally between the liquid-gas inlet 4 and the gas outlet 3 to assist in the separation of liquid from the gas flowing to outlet 3. Such baffle system can comprise a plurality of plates 6 and 7 disposed transversely across vessel 2 and having their peripheries spaced from the walls thereof by a small distance to provide turbulence in the gas flowing between the edges of the plates and the walls of the vessels which assists in coalescing any liquid entrained in the gas. Such plates could be constructed of fine wire mesh or other perforated material adapted to create a high turbulence in the gas flowing therethrough. A spray collector 8 is provided near the upper extremity of the vessel and has a plurality of slots 9 through which the gas and any liquid remaining therein can flow into the interior of the collector. A tail pipe 10 opens out into the bottom of the spray collector to conduct liquid downwardly into the vessel 2 to a point preferably below a liquid level maintained in the vessel thereby effecting a liquid seal at the lower end of conduit 10. Outlet 3 can comprise a conduit which opens into the upper portion of spray collector 8 to conduct gas from vessel 2.

In accordance with one important aspect of this invention, means are provided in flow line 1 for causing a portion of the liquid flowing therethrough to be bypassed into vessel 2 and for further causing any fluid passing into the vessel which is not removed through outlet 3 to flow back into the flow conduit 1. Such means comprises a device having an orifice therein adapted to create a pressure differential between the upstream and downstream sides thereof, which pressure differential is employed to cause fluid to pass into vessel 2 and also to flow from the vessel back into the flow line. Illustrated in the drawing is a pair of orifice flanges 11 and 12 having an orifice plate 13 disposed therebetween. The plate has an orifice 14 therein of a size as discussed below. Suitable seals 14 and 15 can be provided between the orifice plate and the respective flanges in the conventional manner to prevent leakage between the flanges and the plate. An upstream tap 16 and a downstream tap 17 are provided into which are connected conduits 18 and 19, respectively. It will be noted that conduit 18 provides a connection between the upstream tap and inlet 4, whereas conduit 19 provides a connection between outlet 5 and the downstream tap. The upstream tap is spaced from orifice 14 to be at a point where the pressure of the fluid upstream of orifice plate 13 can be utilized to cause fluid to flow into conduit 18 and thence into vessel 2. The downstream tap is situated at a point so spaced from orifice 14 that the pressure at such point is less than the upstream pressure at the upstream tap. The exact location of this downstream tap to realize the minimum downstream pressure thereat is a function of the orifice size and the fluid flow therethrough, and can be readily determined by routine calculation from formulas well known to those skilled in the art.

Orifice 14 should be sufficiently smaller than the inner diameter of conduit 1 so that a pressure differential is created between the upstream and downstream taps of sufficient magnitude that enough fluid can be bypassed through vessel 2 to separate a required volume of gas therefrom. Of course, the exact size of the orifice will be dependent not only upon the proportionate volume of fluid which must be passed into the vessel but, in some instances, it will also be dependent upon the reduction in pressure, if any, required between the upstream side of orifice plate 13 and vessel 2 in order to release the required quantity of gas for passage out of outlet 3 and also upon the pressure differential required between vessel 2 and the downstream tap to move the necessary quantity of liquid or gas from vessel 2 back into flow conduit 1. In this regard, it is convenient to supply a regulator valve 20 in conduit 18 so that the rate of liquid flow into vessel 2 can be readily controlled. Inasmuch as the quantity of gas required to be removed through outlet 3 will ordinarily be substantially constant over a period of time due to the constant speed of operation and load upon the engine driving the pump, regulator 20 can be hand operated so that it can be set to permit sufficient fluid flow into vessel 2 that at least the desired amount of gas separates in the vessel. Any excess gas passes with the liquid through outlet 5 to line 1.

Outlet 3 can be connected to a gas conduit 21 which communicates with a volume tank 22. Such volume tank is provided not only to permit liquid droplets passing with the gas thereinto to settle out but also to act as a surge tank to even out any fluctuations in pressure. A pressure regultaing and reducing valve 23 can be provided in conduit 21 to reduce the pressure from that occurring in vessel 2 to a much lower pressure which is normally needed to operate an engine which is schematically illustrated at 24.

A pressure gauge 25 can be provided at the gas outlet to permit an observance of the pressure within vessel 2, and a sight glass 26 can be provided in the lower portion of the vessel to permit a determination of the liquid level therein.

From the foregoing, it can be seen that with liquid-gas admixture flowing through conduit 1, orifice plate 13 will create a pressure differential between upstream tap 16 and downstream tap 17. Upon opening regulator valve 20, liquid will flow through conduit 18 into vessel 2. The fluid discharged into vessel 2 will separate into gas and liquid phases due to the somewhat lower pressure of vessel 2 as compared to the pressure of conduit 1 upstream of the orifice. The gas thus liberated will flow upwardly around the outsides of plates 6 and 7 to spray collector 8. From this collector, the gas flows out through outlet 3, conduit 21 and volume tank 22 to engine 24. The liquid introduced into the vessel, as well as any excess gas, will pass to the bottom of the vessel and out through conduit 19 back to the downstream tap. In this manner, only a portion of the fluid flowing through conduit 1 will be bypassed through the tank for separation of gas while the remainder of the fluid not so bypassed will continue flowing through orifice 14. The pressure differential created by fluid flowing through this orifice causes the fluid to be bypassed to flow into and out of vessel 2, and this is done without providing any pumps for moving fluid from conduit 1 into the vessel or for moving fluid from the vessel back into the conduit. This arrangement is particularly suited for isolated locations where it is desired to remove a portion of gas from a petroleum fluid flowing through a pipeline or the like without having to supply a pump for effecting such removal and without supplying any power whatsoever except that indirectly derived from the pump and engine driven by the gas separated by the system.

It should be noted that should fluid flow stop in conduit 1, as when the pump moving the fluid therethrough becomes inoperative, or if the sucker rod used to pump a well should part, the engine driving such pump or sucker rod will automatically stop because, upon cessation of flow of fluid through conduit 1, fluid will no longer flow into vessel 2, and, accordingly, gas cannot flow to the engine. Also, if a valve downstream of the orifice plate should inadvertently be closed, the engine will automatically stop due to flooding, thereby avoiding stuffing box blowouts or other breakage of equipment.

While an orifice plate has been shown and described, it will be realized that any other conventional means for restricting the flow through conduit 1 to create a pressure differential between the upstream and downstream sides of such means can be also employed. Such various alternative means for creating such differentials are well known to the art. It is preferred, however, to use an orifice plate not only because its pressure characteristics can be readily calculated but also because it has less tendency to become clogged than many other types of pressure differential creating devices. Further, an orifice plate is simple to install, easy to transport, and can be quickly changed from one positive size to a different positive size by merely separating the orifice flanges and inserting a different plate.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A gas and liquid separator system for separating a quantity of gas from a liquid-gas admixture which comprises, in combination, an accumulator vessel having vertically spaced upper and lower outlets and an inlet therebetween, a baffle system within said vessel disposed principally between said inlet and upper outlet and adapted to aid in the separation of liquid from gas flowing from said inlet to said upper outlet, a flow conduit for a liquid containing the gas to be separated and disposed separately from said accumulator vessel for conducting a portion of said liquid past said vessel, means constricting said flow conduit, a first conduit connecting said flow conduit upstream of said constricting means with said inlet, a second conduit connecting said flow conduit downstream of said constricting means with said lower outlet, said constricting means providing an opening between the upstream and downstream sides thereof which is sufficiently smaller than said flow conduit as to create a predetermined pressure differential between said upstream and downstream sides, which differential is of sufficient magnitude to cause the remaining portion of said liquid-gas admixture to bypass into said vessel.

2. The separator system of claim 1 wherein said constricting means comprises an orifice plate disposed transversely of said flow conduit.

3. The separator system of claim 2 in combination with orifice flanges on each side of said plate, said first and second conduits being tapped into said flow conduit through said flanges.

4. The separator system of claim 1 in combination with a volume tank, a gas conduit connecting said tank with said upper outlet and a pressure reducing and regulating valve in said gas conduit.

5. A liquid and gas separator system for separating a quantity of gas from a liquid-gas admixture which comprises, in combination, an accumulator vessel, vertically spaced apart upper and lower outlets from said vessel, an inlet to said vessel intermediate said outlets, a flow conduit for said liquid-gas admixture, said flow conduit being separate from said accumulator vessel for conducting a portion of said admixture past said vessel, a device disposed in said flow conduit and having an orifice therethrough for causing a pressure of the fluid flowing in the flow conduit at a point downstream of the device to be less than the pressure upstream of said device, a first conduit connecting said inlet to said flow conduit upstream of said device, a second conduit connecting said lower outlet to said flow conduit at said point downstream of said device, said orifice being of a size relative to that of said flow conduit to sufficiently lower the pressure of fluid flowing at said downstream point that fluid will flow from said lower outlet of said vessel through said second conduit to said flow conduit.

6. The separator system of claim 5 in combination with a back pressure regulating valve connected to said upper outlet.

7. A gas and liquid separator system for separating a quantity of gas from a liquid-gas admixture which comprises, in combination, an accumulator vessel, a first outlet near the upper extremity of said vessel, a second outlet near the lower extremity of said vessel, a fluid inlet intermediate said outlets, a baffle system in said vessel disposed principally between said inlet and first outlet and adapted to assist in separating a liquid from a gas flowing toward said first outlet, a device containing an orifice and adapted to be connected in a flow conduit separate from said accumulator vessel for conducting a portion of said admixture past said vessel, said device having an upstream tap and a downstream tap, the latter being situated at a point where the pressure of a fluid flowing through said orifice will be less than the pressure of the fluid at the upstream tap, a first conduit connecting said upstream tap with said inlet, a second conduit connecting said second outlet with said downstream tap, the size of said orifice being sufficiently small that the pressure of the fluid flowing at said point is low enough relative to the pressure upstream of said device to cause fluid to flow from said vessel to said downstream tap.

8. A gas and liquid separator system for separating a quantity of gas from a liquid-gas admixture which comprises, in combination, an accumulator vessel, a first outlet and a second outlet for said vessel, a fluid inlet to said vessel, a flow conduit for a liquid containing a gas to be separated and disposed separately from said accumulator vessel for conducting a portion of said liquid past said vessel, means constricting said flow conduit, a first conduit connecting said conduit upstream of said constricting means with said inlet, a second conduit connecting said second outlet with said flow conduit downstream of said constricting means, said constricting means providing an opening between the upstream and downstream sides thereof which is sufficiently smaller than said flow conduit as to create a predetermined pressure differential between said upstream and downstream sides, which differential is of sufficient magnitude to cause fluid to flow from said flow conduit through said first conduit into the vessel and from said vessel through the second conduit to said flow conduit.

References Cited in the file of this patent

UNITED STATES PATENTS

| | | |
|---|---|---|
| 1,174,743 | Leet | Mar. 7, 1916 |
| 1,255,018 | Jones | Jan. 29, 1918 |
| 1,350,576 | Smith | Aug. 24, 1920 |
| 1,363,487 | Taber | Dec. 28, 1920 |
| 1,440,197 | Wirshing | Dec. 26, 1922 |
| 2,221,169 | Raney et al. | Nov. 12, 1940 |
| 2,616,514 | Shobe | Nov. 4, 1952 |